(12) United States Patent
Yuzawa (10) Patent No.: US 6,363,061 B1
(45) Date of Patent: Mar. 26, 2002

(54) DATA TRANSMISSION DEVICE, RECEPTION DEVICE, DATA TRANSMISSION SYSTEM, AND DATA TRANSMISSION METHOD

(75) Inventor: Keiji Yuzawa, Saitama (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/033,017

(22) Filed: Mar. 2, 1998

(30) Foreign Application Priority Data

Mar. 7, 1997 (JP) .............................................. 9-053544

(51) Int. Cl.$^7$ .............................. H04J 3/00; G06F 15/16
(52) U.S. Cl. ........................ 370/345; 370/498; 370/537; 709/219
(58) Field of Search ................................ 370/498, 503, 370/537, 539, 541, 486, 487, 345, 326; 348/423.1, 464, 487, 491, 492, 734; 455/45; 709/219

(56) References Cited

U.S. PATENT DOCUMENTS

| | | | |
|---|---|---|---|
| 5,063,610 A | * 11/1991 | Alwadish | 455/45 |
| 5,239,540 A | * 8/1993 | Rovira et al. | 370/345 |
| 5,440,632 A | 8/1995 | Bacon et al. | 380/20 |
| 5,675,575 A | * 10/1997 | Wall, Jr. et al. | 370/326 |
| 5,715,020 A | * 2/1998 | Kuroiwa et al. | 348/734 |
| 5,991,801 A | * 11/1999 | Rebec et al. | 709/219 |

FOREIGN PATENT DOCUMENTS

| | | |
|---|---|---|
| EP | 0 399 200 A2 | 11/1990 |
| JP | 01220925 | 9/1989 |
| WO | WO 96/13932 | 5/1996 |

OTHER PUBLICATIONS

Reynolds & Postel, "Assigned Numbers", Internet Engineering Task Force, Jul. 1992, pp. 56–58.

* cited by examiner

*Primary Examiner*—Alpus H. Hsu
*Assistant Examiner*—Afsar M Qureshi
(74) *Attorney, Agent, or Firm*—Lerner, David, Littenberg, Krumholz & Mentlik, LLP (57) ABSTRACT

Proper data is selected from a plurality of data which are multiplexed and transmitted to download the proper data. The maker and model of a receiver and the version of a control program are stored in a load section as a maker ID, a model ID, and a version ID. The section number and the total number of sections are also stored. It is checked whether the maker ID and the model ID coincide with those stored in the ROM of the receiver to check whether the version number is newer than that of the control program of the receiver. Therefore, it can be checked whether the program should be downloaded. With reference to the list of section numbers which have been downloaded, it can be found whether a program divided into a plurality of sections to be transmitted is completely downloaded. With reference to the list of section numbers and the total number of sections, the progress state of downloading can be known.

6 Claims, 7 Drawing Sheets

|  | TRANSPONDER ||||  |
|---|---|---|---|---|---|
|  | A | B | C | D | ----- |
| PROGRAM DATA TO BE TRANS- MITTED | MAKER a MODEL b | MAKER c MODEL d | MAKER a MODEL g | --- | ----- |
|  | --- | MAKER e MODEL f | MAKER h MODEL i | --- |  |
|  | --- | --- | --- | --- |  |

DATA TRANSMISSION DEVICE, RECEPTION DEVICE, DATA TRANSMISSION SYSTEM, AND DATA TRANSMISSION METHOD

BACKGROUND OF THE INVENTION

1. Field of the Invention

The present invention relates to a data transmission device, a reception device, a data transmission system, and a data transmission method which are used when a plurality of program data are transmitted by using, e.g., a digital satellite broadcast.

2. Description of the Related Art

At present, a digital satellite broadcast which transmits digital data by using a communication satellite to perform broadcast has spread. In this digital satellite broadcast, video and audio signals are compressed and encoded by a predetermined scheme, and the compressed and encoded video and audio signals are transmitted to viewers through the communication satellite. As a compressing/coding scheme for video and audio signals, for example, MPEG2 (Moving Picture Experts Group) is used.

Figure 10:
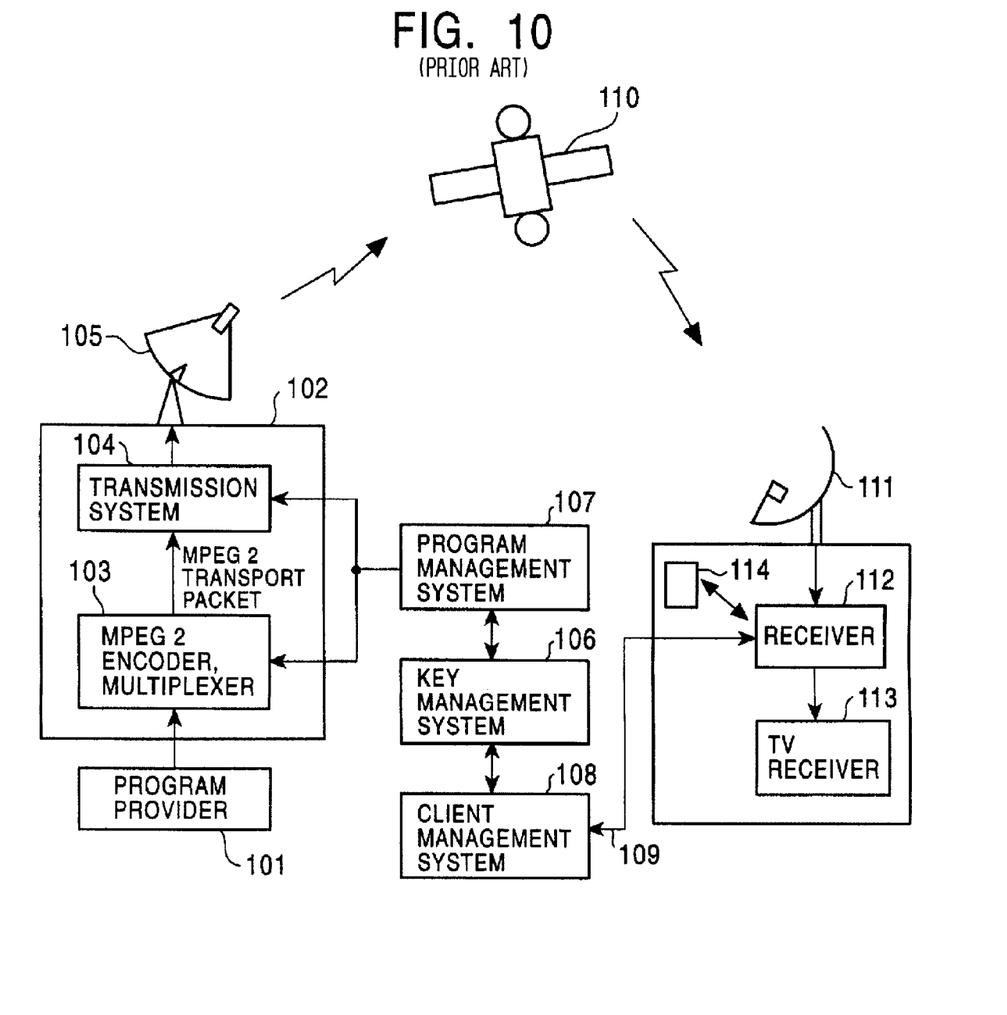
FIG. 10 is a view showing the outline of a typical digital broadcast system.

FIG. 10 shows the outline of a typical digital broadcast system. The program transmission side is constituted by an up-link station, a program provider, and a management system.

Video/audio data from a program provider 101 is supplied to an encoder, multiplexer 103 of MPEG (Moving Pictures Expert Group)2 of an up-link station 102. The video/audio data is compressed in the MPEG2 encoder, multiplexer 103, and the compressed video/audio data is filled in a packet having a length of 188 bytes. A plurality of programs and packets of video/audio data corresponding to the programs are multiplexed to form a transport packet of MPEG2. A large number of transport packets are connected to each other to form a transport stream. The number of transport streams corresponds to the number of transponders mounted on a communication satellite.

The MPEG2 transport packets are supplied to a transmission system 104. In the transmission system 104, processes such as a scramble process for each packet, error correction coding for each packet, and modulation are performed, and a modulated output is supplied to a transmission antenna 105. The scramble process is required to realize conditional access used to control the audiovisual quality for each viewer. For example, a pay-per view contract in which only a certain program is watched every paying is made possible. A key for canceling the scramble is supplied from a key management system 106 to the MPEG2 encoder, multiplexer 103, and is inserted into the transport packet as one of packets like video/audio information.

The MPEG2 packets are integrally managed by a program management system 107. The program management system 107 is coupled to the key management system 106 to decode a key for canceling scramble. A client management system 108 is arranged to manage items or the like related to audiovisual contracts. Accounting information is transmitted between the client management system 108 and the house of a viewer through a telephone line 109.

Broadcast radio wave is transmitted from the transmission antenna 105 and received by a reception antenna 111 of each house through a communication satellite 110. A receiver 112 is connected to the reception antenna 111. The receiver 112 is constituted by a tuner for designating a reception transponder, a demodulator, a scramble unit for canceling scramble, a demultiplexer for designating separate packets, a video decoder, an audio decoder, and the like. Decoded video/audio signals are supplied to a television receiver 113.

A key for canceling scramble is encoded and transmitted as relevant information together with image/voice. The key for solving cryptography is stored in an IC card 114 inserted in the receiver 112. Program scrambles which can be solved by a transmission side can be controlled by the transmission side on the basis of the contract information of each reception system. A receiver having a conditional access function is called an IRD (Integrated Receiver/Decoder).

The above digital satellite broadcast system has only just begun to be practically used, and a program for controlling a recent receiver on a reception side may be variably changed. For this reason, this program is stored as data in a programmable ROM built in the receiver. As the programmable ROM, a flash ROM such as an EEPROM (Electrically Erasable Programmable ROM) is known. This change generally has an object to provide new services and additional values to clients. Several methods can be effective as countermeasures against the change in program.

For example, when a program ROM built in a receiver is replaced with another one, or the receiver is entirely replaced with another one, a countermeasure against the change in program can be made. When an IC card in which a new program is stored is distributed to a client by using the interface, for an IC card, arranged in the receiver, the new program can be loaded from the IC card. However, when a large number of receivers which have been arranged, it is difficult to replace the ROMs of the receivers and collect the receivers. In addition, a method of distributing IC cards requires high cost. Since each IC card has a relatively small memory capacity, the IC card cannot easily store a program.

As a method of solving the above problem, the following method is provided. That is, latest program information is received from a transmission side, and this program is loaded on a receiver on a reception side. More specifically, program data is inserted into a data stream transmitted by satellite broadcast using, e.g., the MPEG2 system, and the program data is received by a viewer by means of a receiver to download the program data. The downloaded program data is temporarily written in, e.g., a RAM built in the receiver, and the program data is transferred from the RAM to a flash ROM, thereby updating the program.

A piece of software of one type is conventionally applied to all reception devices. More specifically, a necessary piece of software cannot be selected from pieces of software of various types. For this reason, on the receiver side, the type of a host processor (CPU) or an OS (Operation System), the type of an interpreter for executing a program, or the like must be limited to one. Therefore, program data cannot be downloaded on a receiver in which these types are not integrated.

For example, in a personal computer or the like, when a program is to be downloaded, an operator examines the version of the program, and the version can be compared with the version of the same program owned by the operator at present. In this manner, in a personal computer or the like, the programs whose versions are equal to each other can be prevented from being repetitively downloaded.

However, downloading by such a conventional receiver for satellite broadcast is performed regardless of the version of a program to be downloaded. Therefore, it is a problem that a program whose version is equal to the version of the program which has been downloaded may be repetitively downloaded in vain. It is another problem that the version of the downloaded program may be older than the version of the program which is owned.

Also in downloading by a personal computer, determination of version information is left to an operator's hand. For this reason, the failure described above may occur in the downloading.

In addition, program data to be downloaded has a size of, e.g., several MBytes. Therefore, the downloading of the program data requires several minutes or several ten minutes. In a conventional system, a progress state of downloading, e.g., the rate of the size of downloaded data to the total size of program data is not displayed. For this reason, the following problem arises. That is, time of the end of downloading cannot be recognized, and an operator who executes the downloading is displeasured.

On the other hand, when a different types of program data are to be transmitted, the following method may be used. That is, a plurality of transmission paths are used, and these program data are transmitted through different paths, respectively. For example, in this satellite broadcast, a plurality of transponders to which different carrier frequencies are allocated are used, so that data streams are transmitted to receivers. Therefore, transponders can be allocated to receivers depending on the makers and models of the receivers. However, a conventional system has no information representing a transponder from which specific program data is transmitted. For this reason, corresponding program data cannot be substantially downloaded on the reception side.

SUMMARY OF THE INVENTION

Therefore, it is an object of the present invention to provide a data transmission device, a reception device, a data transmission system, and a data transmission method which can select proper data from a plurality of data which are multiplexed and transmitted to download the selected proper data.

In order to solve the above problem, the present invention provides a data transmission device for time-divisionally multiplexing signals of a plurality of channels and further multiplexing the plurality of time-divisionally multiplexed signals to simultaneously transmit the signals, characterized in that receiver maker identification information for identifying makers of reception devices for receiving transmitted information and receiver model identification information for identifying models of the makers of the reception devices are transmitted.

In order to solve the above problem, the present invention provides a data reception device for designating a predetermined signal from multiplexed and transmitted signals to receive the predetermined signal, characterized by comprising: means for extracting only necessary information on the basis of receiver maker identification information and receiver model identification information included in the received signal to store the extracted information; and control means for using the stored information as a program for unit control.

In order to solve the above problem, the present invention provides a data transmission system for time-divisionally multiplexing signals of a plurality of channels and further multiplexing the plurality of time-divisionally multiplexed signals to simultaneously transmit the signals, and designating a predetermined signal from the multiplexed and transmitted signals to receive the predetermined signal, characterized by comprising: transmission means for transmitting receiver maker identification information for identifying makers of reception devices for receiving transmitted information and receiver model identification information for identifying models of the makers of the reception devices; reception means for receiving the transmitted information; means for extracting only necessary information on the basis of the receiver maker identification information and the receiver model identification information included in the received information to store the extracted information; and control means for using the stored information as a program for unit control.

In order to solve the above problem, the present invention provides a data transmission method for time-divisionally multiplexing signals of a plurality of channels and further multiplexing the plurality of time-divisionally multiplexed signals to simultaneously transmit the signals, characterized in that receiver maker identification information for identifying makers of reception devices for receiving transmitted information and receiver model identification information for identifying models of the makers of the reception devices are transmitted.

As described above, according to the present invention, since receiver maker identification information for identifying makers of reception devices for receiving transmitted information and receiver model identification information for identifying models of the makers of the reception devices are transmitted, proper information can be selected from pieces of multiplexed and transmitted information to receive the proper information.

DESCRIPTION OF THE PREFERRED EMBODIMENT

Figure 1:
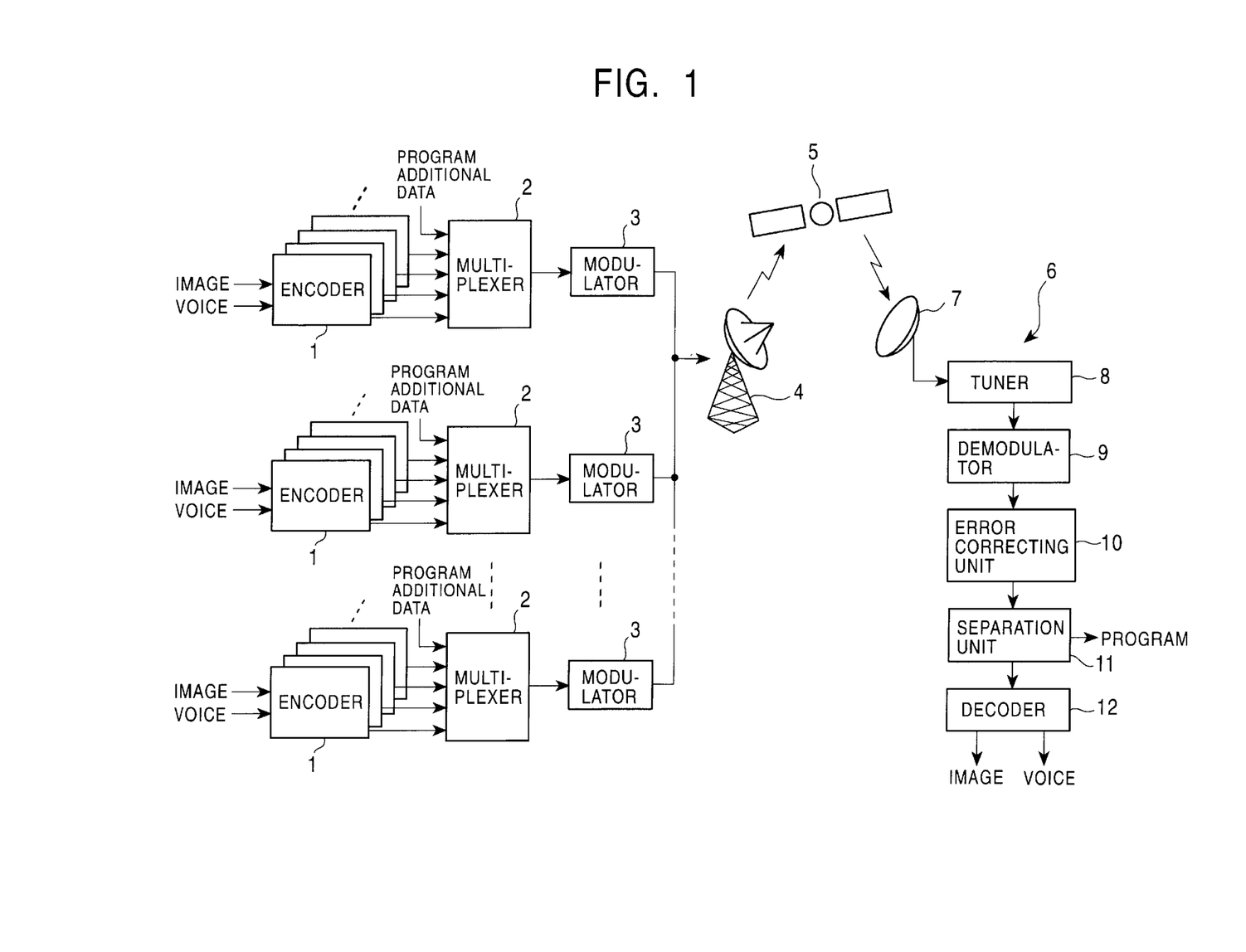
FIG. 1 is a block diagram showing an example of a data transmission system which can be applied to the embodiment.

An embodiment of the present invention will be described below with reference to the drawings. FIG. 1 shows an example of a data transmission system which can be applied to one embodiment of the present invention. In this system, video data, audio data, other data which are converted into a serial data stream on a transmission side are modulated, and the data stream is converted into a radio wave in a predetermined frequency band by a transmission equipment 4 to be transmitted. This radio wave is repeated by a communication satellite 5 and received by a receiver 6.

On the transmission side, a video signal and an audio signal are supplied to an encoder 1. In the encoder 1, the supplied signals are high-efficiently encoded to be encoded.

In this embodiment, an MPEG2 system is used for high efficiency encoding in the encoder 1. More specifically, the video signal is subjected to motion compensation by DCT (Discrete Cosine Transformation) and motion vector calculation, and the video signal is quantized to be encoded. The audio signal is subjected to sub-band encoding by using audiovisual psychological encoding.

In the encoder 1, the encoded video signal and the encoded audio signal are time-divisionally multiplexed to form a serial data stream. The data stream is supplied to a multiplexer 2. In this system, to cope with transmission through a plurality of channels in one frequency band, a plurality of encoders 1, e.g., of 6 channels, can be set in each frequency band. Data streams output from the respective encoders 1 are supplied to the multiplexer 2.

Figures 2, 3:
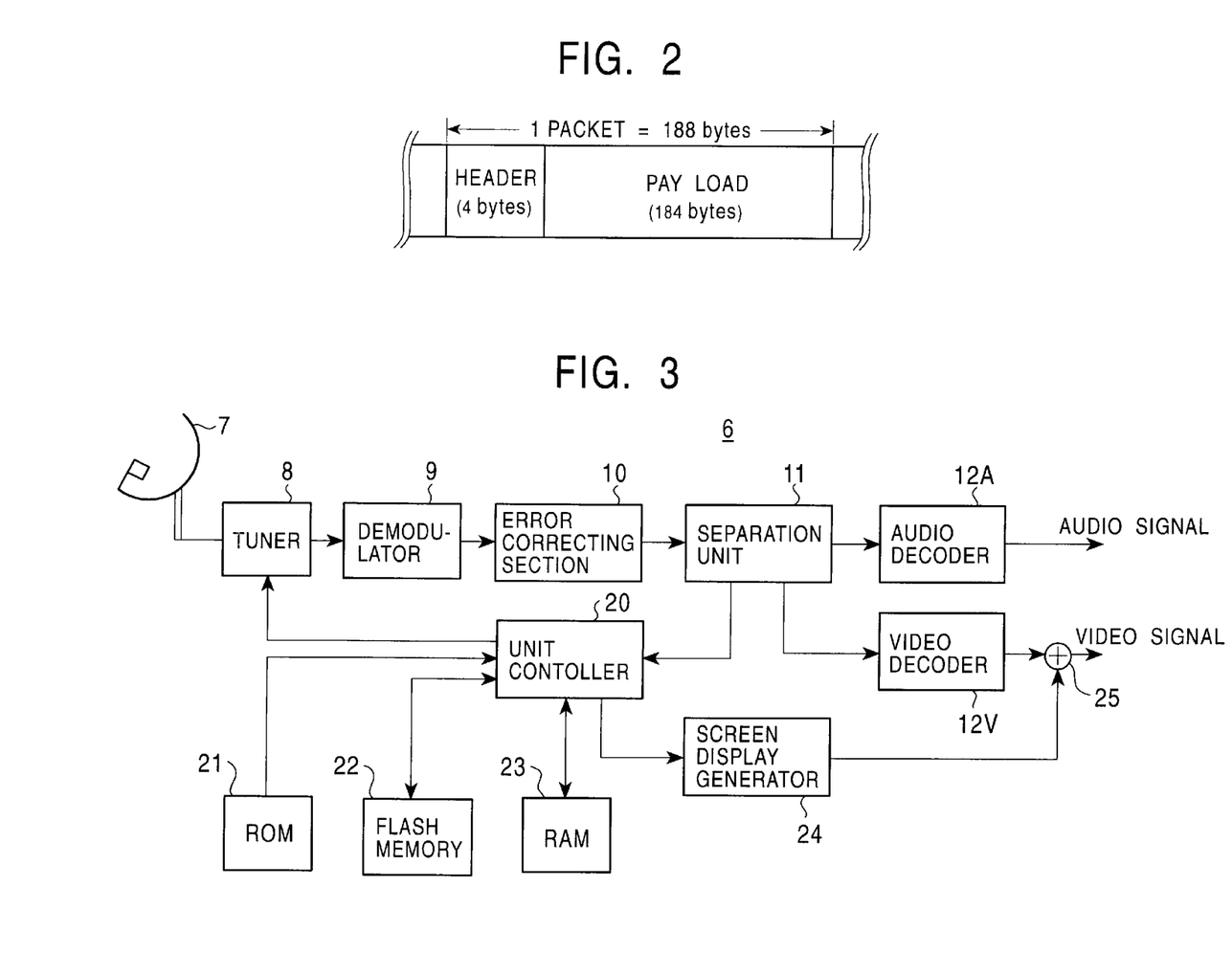
FIG. 2 is a schematic diagram for explaining a transport packet.
FIG. 3 is a block diagram showing an example of the more detailed arrangement of a receiver.

In the multiplexer 2, the video/audio signals, program code data, and the additional data which are supplied from the plurality of encoders 1 are further multiplexed by time-divisional multiplexing. The additional data includes, e.g., text data or the like. In the MPEG2, the data streams are divided in units called packets to be transmitted. As shown in FIG. 2, one packet is constituted by a 4-byte header portion and a 184-byte pay-load portion, and has a size of 188 bytes. The divided data streams are stored in the pay-load portion. In the header portion, information of packets and information representing the relationship between the packets are stored. A PID serving as identification information of the packets is added to the header portion.

More specifically, in this multiplexer 2, the data stream is divided every 184 bytes, and predetermined header information is added to the data to generate a packet, thereby multiplexing the data stream. As a result, the same PID is added to transport packets generated by data streams output from the same encoder. A stream obtained by connecting transport packets described above to each other by a transmission form is called a transport stream. The transport stream output from the multiplexer 2 is supplied to a modulator 3.

In the modulator 3, QPSK (Quadrature Phase Shift Keying) modulation is performed to a transport packet to obtain a modulated signal in a predetermined frequency band, and the modulated signal is output. The modulated signal output from the modulator 3 is supplied to the transmission equipment 4 having a power amplifier and a transmission antenna.

Actually, a scramble process for a transport packet, an error correction coding process by a Read-Solomon code, an interleaving process to cope with a burst error, a convolution coding process, and the like are performed.

Transmission can be performed with respect to a plurality of frequency bands. For this reason, in this system, as shown in FIG. 1, a plurality of arrangements each constituted by the plurality of encoders 1, the multiplexer 2, and the modulator 3 can be arranged. The respective modulators 3 perform modulation in frequency bands which are different from each other. Modulated signals output from the modulators 3 are supplied to the transmission equipment 4.

The modulated signals are converted into radio waves, and the radio waves are transmitted from the transmission equipment 4 to the communication satellite 5. The communication satellite 5 comprises transponders (satellite repeaters). The transponder repeats a radio wave in a predetermined frequency band. When a plurality of transponders having frequency bands corresponding to the transponders are arranged on the communication satellite 5, radio waves in a plurality of frequency bands can be simultaneously repeated. For example, 28 transponders are arranged on the communication satellite 5. Therefore, in transmission from the transmission equipment 4 to the communication satellite 5, radio waves in a plurality of frequency bands corresponding to the number of transponders arranged on the communication satellite 5 are simultaneously transmitted.

In many cases, the plurality of transponders are managed by different entrepreneurs, respectively.

A radio wave transmitted from the transmission equipment 4 and repeated by the communication satellite 5 is received by an antenna 7 of the receiver 6 to be a reception signal. The reception signal is supplied to a tuner 8 and subjected to predetermined signal processing (to be described later) by a demodulator 9, an error correcting unit 10, a separation unit 11, an MPEG decoder 12, and the like to output video and audio signals, and predetermined data can be obtained.

FIG. 3 shows an example of a more detailed arrangement of the receiver 6. The reception signal received by the antenna 7 is supplied to the tuner 8. The tuner 8 designates a transponder from which a signal is received by the tuner 8 to select a predetermined frequency band. The selected reception signal is supplied to the demodulator 9 to be subjected to a QPSK demodulation process, and a transport packet whose error is corrected by the error correcting unit 10 is recovered. The error correcting unit 10 decodes a Read-Solomon code and performs a Viterbi decoding process to perform error correction. This transport packet is supplied to the separation unit (demultiplexer) 11.

In the separation unit 11, a packet of a desired channel is separated from other packets, and descramble for the packet is performed. The packet is further separated into video data, audio data, and additional data (including program information) on the basis of information of a header portion. The video data is decoded by a video decoder 12V to obtain a received video signal. The audio data is decoded by an audio decoder 12A to obtain a received audio signal. These video decoder 12V and the audio decoder 12A are included in the MPEG decoder 12 (see FIG. 1). The additional data is supplied to a unit controller 20. An adder 25 adds a display signal to the decoded video data, and an output video signal from the adder 25 is displayed on a display. Similarly, the decoded audio signal is amplified by, e.g., an amplifier, to be output from a loudspeaker.

The unit controller 20 is to control the operation of the entire receiver, and is constituted by a microcomputer. A ROM 21, a flash memory 22, a RAM 23, and a screen display generator 24 are coupled to the unit controller 20. In the ROM 21, a program for download control is stored. The download control performed by the unit controller 20 is made on the basis of the program stored in the ROM 21. A program for general operation control is stored in the flash memory 22. The general operation control (i.e., control except for the download control) performed by the unit controller 20 is made on the basis of the program stored in the flash memory 22. The RAM 23 is used as a temporary storage unit used when the flash memory 22 is updated. The screen display generator 24 generates various display signals under the control of the unit controller 20. This display signal is supplied to the adder 25 to be superposed on the decoded video signal.

In this invention, a program for controlling the above receiver 6 is transmitted through the communication satellite 5. More specifically, program data is supplied as additional data to the multiplexer 2, subjected to the above processes, transmitted from the transmission equipment 4 together with video and voice which are high-efficiently encoded by the MPEG2, and repeated by the communication satellite 5. A user causes the receiver 6 to receive the transmitted program data, so that, for example, an updating operation for the program of the receiver 6 can be performed.

When a program is downloaded on the receiver 6, program information separated by the separation unit 11 is written in the RAM 23 by the unit controller 20. A write operation is performed every unit of updating (e.g., 64 kbytes). Until the process corresponding to one unit of updating of the flash memory 22 is completed, the information is held by the RAM 23. A program of one unit of updating is read from the RAM 23, written in the flash memory 22, and then subjected to an updating process. Until updating of all the programs to be downloaded is completed, the process of one unit of updating is repeated.

Figure 4:
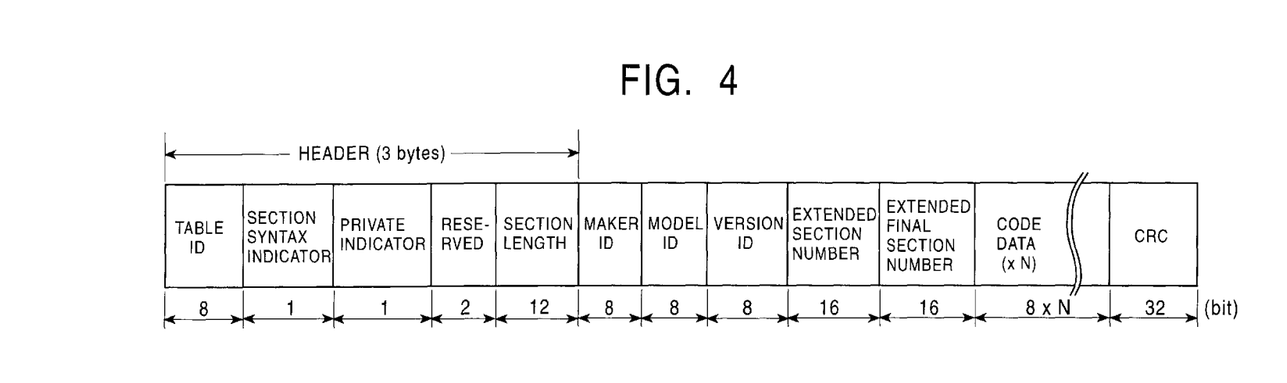
FIG. 4 is a schematic diagram showing an example of the arrangement of a load section.

FIG. 4 shows an example of the arrangement of a data stream for transmitting program data. In this example, program data is processed according to the form of a private section ruled by Systems (ISO 13818-1). In the MPEG2, a data stream is handled in a component unit called a pack obtained by bundling a plurality of packets. In the pack, two types of components, i.e., a section and a PES (Packtized Elementary Stream) packet are arranged depending on the types of streams to be transmitted or a data configuration. Control information or the like is transmitted by the section, and an image or voice is transmitted by the PES packet.

Also in a section, portions other than a header are determined on the basis of the rules of the MPEG2. For example, a PAT (Program Association Table), a PMT (Program Map Table), and a CAT (Conditional Access Table) in which, e.g., the specification information of a program is transmitted, and the private section in which only a header is determined are arranged. A plurality of sections, e.g., 1,024 sections are gathered to constitute one table. In this embodiment, program data is stored in the private section to be transmitted.

As private sections, there are a short private section having a header size of 3 bytes and a long private section having a header size of 8 bytes. Program data is stored in the short private section. A header is constituted by the first five regions, i.e., a table ID, a section syntax indicator, a private indicator, a reserved region, and a section length. In the remaining portion, program data and other necessary data are stored.

The section in which the program data is stored is called a load section. The table ID having 8 bits determines the contents of the section. In this case, a value representing that the section is a load section is stored in the table ID. The section syntax indicator indicates, as one bit, whether the header type of the section is a short type or a long type. For example, if the value of the section syntax indicator is '1', the long type is determined; if the value is '0', the short type is determined. The private indicator indicates whether the section is a private section. If the value is '1', it is determined that the section is a private section. In the 2-bit reserved region, '11' is stored.

In the section length, the number of bytes of the section started immediately after 12 bits determined as the section length is stored. Up to the section length, the header is ended. Since 12 bits are allocated to the section length, a maximum of 4,096 bytes can be expressed. More specifically, data having a maximum of 4,096 bytes can be stored in the regions following the region of the section length.

A maker ID has 8 bits, and represents a receiver maker identification number for identifying the maker of a receiver. More specifically, different receiver maker identification numbers are allocated to the makers of receivers in advance. A model ID having 8 bits represents a model identification number for identifying the model of a receiver. The model identification number can be uniquely allocated to each maker. More specifically, different makers (receiver maker identification numbers) may have the same model identification number. When the maker ID and the model ID are combined to each other, a receiver can be specified.

A version ID has 8 bits, and represents the version of program data transmitted by the private section. More specifically, the version identification number of program data corresponding to a model specified by the maker ID and the model ID is represented by the version ID.

The subsequent extended section number has 16 bits, and represents a section number Sno allocated to the section. The subsequent extended final section number has 16 bits, and represents the total number Ssum of sections having the same table ID, the same maker ID, the same model ID, and the same version ID.

The subsequent 8 bits are defined as a code data region, and the main body of program data is stored in this region. A plurality of code data regions described above, e.g., N code data regions, can be continuously set in the same section. Therefore, program data of (8×N) bits can be transmitted per section.

As described above, the maximum size of data which can be stored in the region following the header is limited to 4,096 bytes as a section length. For this reason, when the size of other data is subtracted from the size of 4,096 bytes, N is set to be 4,085 at the maximum. Since the total size of the program data is actually, e.g., about 2 MBytes, transmission of the program data is shared by a plurality of load sections. Different section numbers Sno are added to the divided load sections, respectively. In this case, it is convenient for the following processes that the section numbers Sno are sequentially added from the start of the program data.

The final CRC having 32 bits is CRC (Cyclic Redundancy Check) which is performed by data immediately before the CRC in this section. By using information in this CRC region, error detection of the section is performed.

As described above, a plurality of transponders are mounted on the communication satellite 5, and transmission can be simultaneously performed from the plurality of transponders in different frequency bands. In this case, the same program data are not transmitted from the plurality of transponders, respectively, but program data corresponding to receivers whose makers and models are different depending on the transponders may be transmitted from the transponders. For example, program data corresponding to model b of maker a is transmitted from transponder A, program data corresponding to model d of maker c and model f of maker e are transmitted from transponder B, and program data corresponding to model g of maker a and model i of maker h are transmitted from transponder C. In this manner, program data corresponding to different makers and different models are transmitted from the respective transponders.

Figure 5:
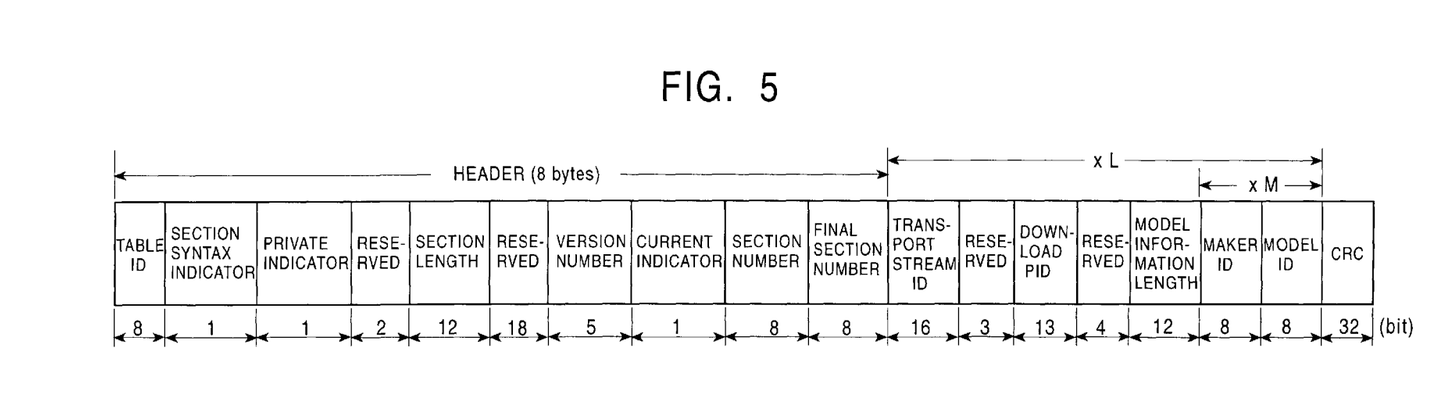
FIG. 5 is a schematic diagram showing an example of the arrangement of a load control section.

Therefore, a transponder from which necessary program data is transmitted must be determined. FIG. 5 shows the arrangement of a data stream for transmitting information representing a specific transponder from which program data corresponding to a specific maker and a specific model is transmitted. Here, as in the above transmission of the above program data, a private section is used. However, in this example, a private section of a long header type is used.

This section is called a load control section. As the load control section, a load control section having the same contents is transmitted from each transponder. The first 3 bytes of the header represent the same contents as that of the above load section. As a matter of course, a value representing a load control section is used as a table ID, and a section syntax indicator is set to be '1' to represent that the header type is long.

A subsequent reserved region having 18 bits is filled with '1'. A version number, a current next indicator, a section number, and a final section number which follow the reserved region are set to be values determined by the MPEG2, respectively. Up to the final section number, the header is ended.

A transport stream ID having 16 bits represents the number Tno of a transponder mounted on the communication satellite 5. Regions extending from the transport stream ID to the position immediately before CRC are repeated by the number of transponders (in this example, L transponders). More specifically, pieces of information shown in the regions extending from the transport stream ID to the position immediately before the CRC correspond to data transmitted by using one transponder represented by the transport stream ID.

The subsequent 3-bit reserved region is filled with '1'. The subsequent download PID having 13 bits a PID used when a load section is transmitted from a transponder represented by a transponder number Tno. The subsequent 4-bit reserved region is filled with '1'.

A model information length having 12 bytes represents the number of bytes of regions extending from the position immediately after the model information length to the position immediately before the CRC region of the end. The subsequent maker ID and model ID have 8 bits each, and represent a receiver maker identification number and a model identification number, respectively. The receiver maker identification number and the model identification number represent the correspondence between program data transmitted from a transponder represented by a transponder number Tno and a specific model being available from a specific maker. The maker ID and the model ID are repeated depending on the type of program data to be transmitted by using one transponder. In this example, M types of data are transmitted by using one transponder, and the maker ID and the model ID are repeated M times.

The final CRC having 32 bits is CRC (Cyclic Redundancy Check) which is performed by data stored up to immediately before the CRC in this section. By using information in this CRC region, error detection of the section is performed.

With the data stream constituted as described above, a user can automatically download proper program data by only instructing the receiver 6 to download the program data. More specifically, when load control sections in which the same contents are transmitted from the respective transponders are received, a transponder number Tno of a transponder from which proper program data is transmitted can be known. On the basis of the transponder number Tno, the proper transponder is automatically designated in the receiver 6. Thereafter, a load section transmitted from the corresponding transponder is received to check, on the basis of the maker ID, the model ID, the version ID, and the like, whether the load section is proper. If the load section is proper, downloading is executed.

Figure 6:
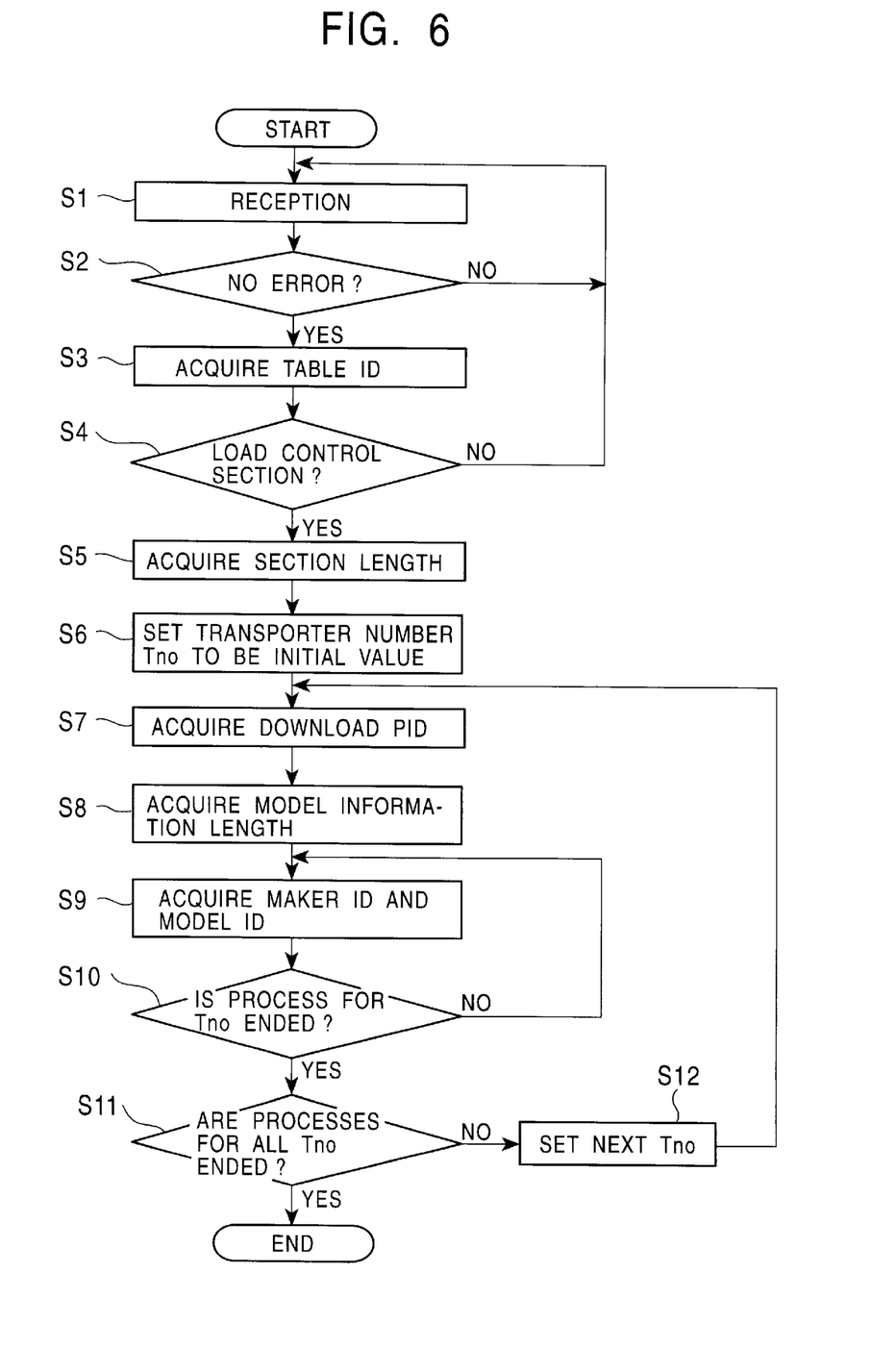
FIG. 6 is a flow chart showing processes performed when a transponder from which a load section corresponding to a receiver is transmitted is designated.

The download process will be described below in detail by using the flow charts shown in FIGS. 6 and 8. FIG. 6 shows processes performed when a transponder from which a load section corresponding to the receiver 6 is transmitted is designated. In the first step S1, an arbitrary transponder is designated to receive a radio wave. The received radio wave is subjected to predetermined signal processing by the tuner 8 and the demodulator 9 as described above and error correction by the error correcting unit 10. The stream of additional data is extracted by the separation unit 11. The stream of additional data is stored in a predetermined region of the RAM 23 through, e.g., the unit controller 20.

The processes following the process in the next step S2 are executed under the control of the unit controller 20. In step S2, data stored in the CRC region is extracted from the stream of additional data stored in the RAM 23. An arithmetic operation performed by the CRC is performed to check whether the transmitted data has an error. If an error is detected, the flow returns to step S1 to receive a radio wave again. If no error is detected, the flow shifts to step S3. In step S3, a table ID is acquired from the received data.

On the basis of the acquired table ID, it is checked whether the received data is a load control section (step S4). If it is determined that the data is not a load control section, the flow returns to step S1.

Although not shown, in step S4, a private indicator included in header information as shown in FIG. 4 or 5 is also used as a condition for the determination.

If it is determined in step S4 that the received data is a load control section, the flow shifts to step S5. Subsequently, processes are executed on the basis of the format shown in FIG. 5. In step S5, a section length is acquired. In the next step S6, the transponder number Tno is set to be an initial value, e.g., $Tno_1$. Subsequently, a download PID at the transponder number $Tno_1$ is acquired in step S7, and a model information length at the transponder number $Tno_1$ is acquired in the next step S8.

In step S9, the maker ID and model ID of program data transmitted from the transponder indicated by the transponder number $Tno_1$ is acquired. The process in step S9 is repeated (repeated M times in this example) on the basis of the model information length obtained in step S7 by the determination in step S10. If it is determined that the processes with respect to the transponder $Tno_1$ are ended, the flow shifts to step S11 to check whether processes for the transponders are ended. If it is determined that the processes are not ended, the transponder number Tno is set to be the next number, e.g., Tno2 (step S12), and the flow returns to step S7.

Figure 7:
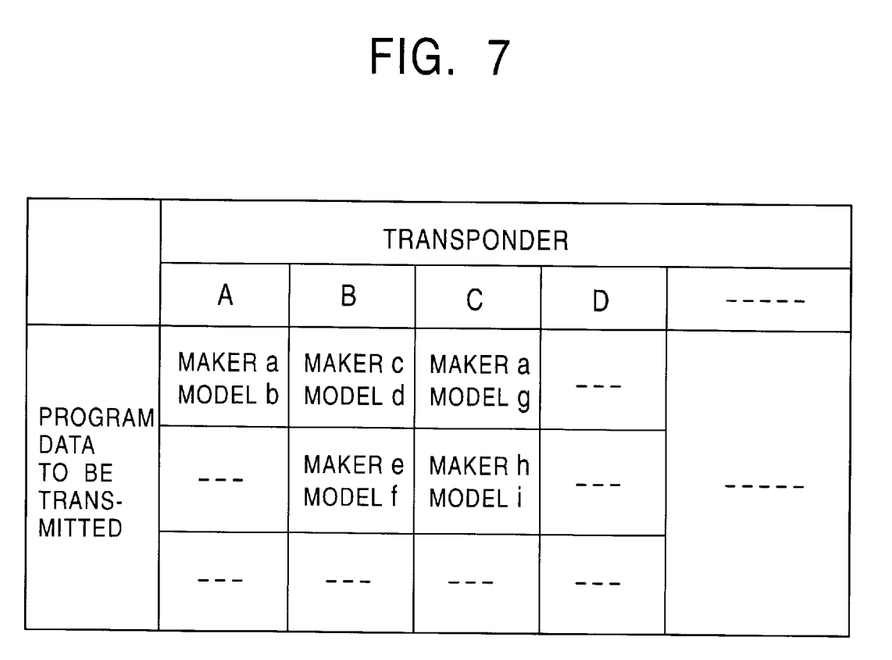
FIG. 7 is a schematic diagram for explaining the correspondence between transponders and the receiver maker identification numbers and model identification numbers of program data transmitted from the corresponding transponders.

If it is determined in step S11 that the processes for the transponders are ended, the series of processes are ended. When the processes shown in the flow chart in FIG. 6 are performed, the correspondence between transponders and the receiver maker identification numbers (maker IDs) and model identification numbers (model IDs) of program data transmitted from the corresponding transponders can be obtained. FIG. 7 shows an example of this correspondence. In the receiver 6, the tuner 8 is controlled by the unit controller 20 based on the correspondence to designate a predetermined transponder.

More specifically, the maker ID and model ID of the receiver 6 is read from the ROM 21 by the unit controller 20, and the correspondence shown in FIG. 7 is referred to. Therefore, a transponder from which program data corresponding to the read maker ID and the model ID is transmitted can be known.

Figure 8:
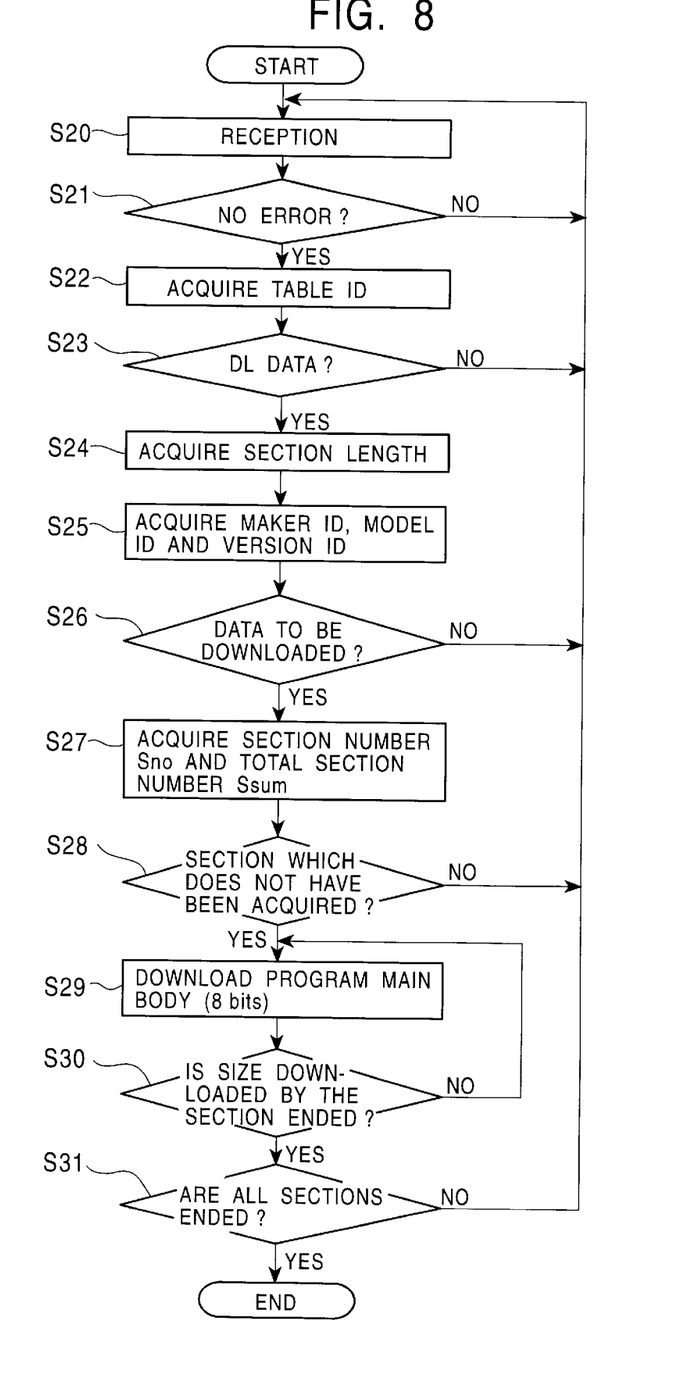
FIG. 8 is a flow chart used when a radio wave from a designated transponder is received to download a program.

FIG. 8 shows a flow chart used when a radio wave from the designated transponder is received to download a program. First, a predetermined transponder obtained by the above correspondence is designated in the first step S20 to receive a radio wave. The received radio wave is subjected to the above processes to extract a stream of additional data. The stream of additional data is stored in the RAM 23.

Processes following the process in the next step S21 are performed under the control of the unit controller 20. In step S21, data stored in the CRC region is extracted from the stream of additional data stored in the RAM 23. An arithmetic operation performed by the CRC is performed to check whether the transmitted data has an error. If an error is detected, the flow returns to step S20 to receive a radio wave again. If no error is detected, the flow shifts to step S22. In step S22, a table ID is acquired from the received data.

On the basis of the acquired table ID, it is checked whether the received data is a load section (download data) (step S23). If it is determined that the data is not a load section, the flow returns to step S20.

Although not shown, in step S23, a private indicator included in header information as shown in FIG. 4 or 5 is also used as a condition for the determination.

If it is determined in step S23 that the received data is a load section, program data is transmitted from this section. For this reason, subsequently, a download process is executed on the basis of the format shown in FIG. 4. In the next step S24, a section length is acquired. In the next step S25, a maker ID, a model ID, and a version ID are acquired. In step S26, it is checked whether the program data to be transmitted from the load section should be downloaded.

A maker ID and a model ID are read from the ROM 21 by the unit controller 20. It is checked whether the read maker ID and the read model ID coincide with the maker ID and the model ID acquired in step S24. If these IDs do not coincide with each other, it is determined that the target program data is not transmitted from the load section.

If these IDs coincide with each other, the version ID of the program data stored at present is read from the flash memory 22. When a program data is to be stored in, e.g., the flash memory 22, this version ID is set as the attribute of the program data. This version ID and the version ID acquired in step S25 are compared with each other. If it is determined as the comparison result that the version ID acquired in step S25 is newer than the version ID of the program data, it is determined that target program data is transmitted from the load section, and the flow shifts to step S27.

Because of the comparison between version IDs, program data of a version which is the same as that of the program data stored in the flash memory 22 at present or program data of an old version can be avoided from being downloaded in vain.

In step S27, a section number Sno and a total section number Ssum are acquired. The section number Sno and the total section number Ssum are stored in, e.g., the RAM 23, and held until all the program data are completely downloaded. In the next step S28, it is checked whether a load section which is received at present is a section which has not been acquired. This determination is made on the basis of the section number Sno.

For example, each time a load section is received, the section number Sno acquired in step S27 is accumulatively stored in the RAM 23, and a table of the section numbers Sno of load sections which have been acquired is formed. Each time a new section number Sno is acquired, the table is referred to check whether a download process is performed (to be described later).

If it is determined in step S28 that the section is not a section which has not been acquired, the flow returns to step S20 to receive the next load section. On the other hand, if it is determined that the section is a section which has not been acquired, the flow shifts to step S29 to acquire program data from the code data region, and the main body of the program is downloaded. The downloaded program data is temporarily stored in a predetermined region of, e.g., the RAM 23.

The program data, as shown in FIG. 4, is stored in code data regions divided into N regions each having a size of 8 bits. The size of the program data stored in the load section can be recognized depending on the section length obtained in step S24 described above, and the value of N can be known. On the basis of the value of N, it is checked in step S30 whether the program data is downloaded by a predetermined size. If the download process for the predetermined size is not ended, the flow returns to step S29 to cause the download process to continue.

If it is determined in step S30 that the download process for the predetermined size is ended, the flow shifts to step S31. In step S31, it is checked whether a download process for a series of load sections in which the program data is stored is ended. This determination is made with reference to, e.g., the section number Sno accumulatively stored in the RAM 23. If it is determined that the download process is not ended, the flow returns to step S20 to perform a download process for the remaining sections.

If it is determined in step S31 that the download process for a series of load sections is ended, it is determined that the download process for the entire program data is completed. The series of processes are ended.

The download process for the entire program data is completed, the program data stored in the RAM 23 is transferred to the flash memory 22 by a predetermined method to be written in the flash memory 22. This process is performed on the basis of, e.g., a loader program stored in the ROM 21 in advance.

Figure 9:
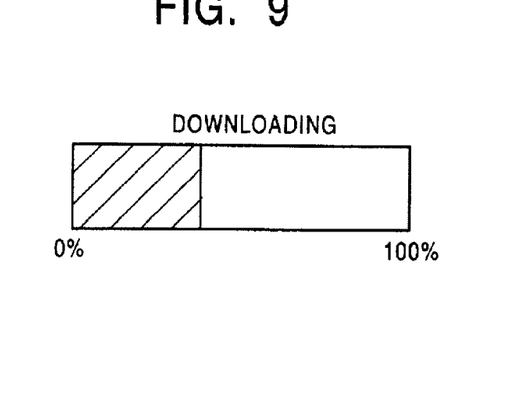
FIG. 9 is a schematic diagram showing an example of the display of a progress state of downloading.

The progress state of downloading may be preferably displayed in the above download process. This progress state can be easily calculated by, e.g., execution of the process in step S29 in FIG. 8 on the basis of the total section number Ssum, the section number Sno accumulatively stored, the section length acquired in step S4, and the number of repeats of steps S29 and S30. Therefore, a percentage of downloaded program data to the entire program data at present can be displayed as in an example shown in FIG. 9. This display is performed by the following manner. That is, a display screen is formed by the image display generator 24 on the basis of the control of the unit controller 20, and the display screen is synthesized with an output from a video signal unit 12 by the adder 25.

Program data is downloaded in the above description. However, the present invention is not limited to this example. For example, data to be transmitted can be easily transmitted as text data, still image data, or moving image data as if messages such as information of new products or update information of programs are transmitted from the maker of a receiver.

As has been described above, according to the present invention, different program data can be transmitted for receiver makers and models, respectively. For this reason, even if a host processor, an OS, an interpreter, and the like are not integrated on the reception side, program data for all receivers can be advantageously downloaded.

According to the present invention, since the version information of program data to be transmitted can be known by a version ID, a download process can be advantageously avoided from being performed in vain.

Further, according to the embodiment, the progress state of downloading can be advantageously displayed. For this reason, even if downloading is performed for a relatively long period of time, stress can be advantageously avoided from acting on a user.

Furthermore, according to the present invention, when there are many makers or models, program data corresponding to the makers or the models can be advantageously transmitted by arbitrary transponders.

What is claimed is:

1. A data transmission device for time-divisionally multiplexing signals of a plurality of communications channels and further multiplexing the plurality of time-divisionally multiplexed signals to simultaneously transmit the signals, comprising at least one multiplexer operable to multiplex the signals of the plurality of communications channels with (i) receiver maker identification information for identifying makers of reception devices for receiving transmitted information, (ii) receiver model identification information for identifying models of the makers of the reception devices, and (iii) information specifying one or more of the communications channels through which the receiver maker identification information and the receiver model identification information are transmitted.

2. The data transmission device according to claim 1, wherein the at least one multiplexer is further operable to multiplex version identification information of the information with the signals of the plurality of communications channels.

3. The data transmission device according to claim 1, wherein the at least one multiplexer is further operable to multiplex quantity information representing the quantity of the information with the signals of the plurality of communications channels.

4. A method for time-divisionally multiplexing signals of a plurality of channels and further multiplexing the plurality of time-divisionally multiplexed signals to simultaneously transmit the signals, comprising multiplexing the signals of the plurality of channels with (i) receiver maker identification information for identifying makers of reception devices for receiving transmitted information, (ii) receiver model identification information for identifying models of the makers of the reception devices, and (iii) information specifying one or more of the communications channels through which the receiver maker identification information and the receiver model identification information are transmitted.

5. The method according to claim 4, further comprising multiplexing version identification information of the information with the signals of the plurality of communications channels.

6. The method according to claim 4, further comprising multiplexing quantity information representing the quantity of the information with the signals of the plurality of communications channels.

* * * * *